(12) United States Patent
L'Huillier et al.

(10) Patent No.: US 10,052,933 B2
(45) Date of Patent: Aug. 21, 2018

(54) SYSTEM FOR CONTROLLING THE DRIVABILITY MODE OF A HYBRID MOTOR VEHICLE

(71) Applicant: RENAULT s.a.s., Boulogne Billancourt (FR)

(72) Inventors: Jean-Marie L'Huillier, Issy les Moulineaux (FR); Alain Alexandre, Maule (FR)

(73) Assignee: RENAULT s.a.s., Boulogne Billancourt (FR)

(*) Notice: Subject to any disclaimer, the term of this patent is extended or adjusted under 35 U.S.C. 154(b) by 0 days.

(21) Appl. No.: 15/306,531

(22) PCT Filed: Apr. 22, 2015

(86) PCT No.: PCT/FR2015/051086
§ 371 (c)(1),
(2) Date: Dec. 20, 2016

(87) PCT Pub. No.: WO2015/166166
PCT Pub. Date: Nov. 5, 2015

(65) Prior Publication Data
US 2017/0100983 A1 Apr. 13, 2017

(30) Foreign Application Priority Data
Apr. 29, 2014 (FR) .................................... 14 53857

(51) Int. Cl.
*B60H 1/02* (2006.01)
*B60H 1/00* (2006.01)
(Continued)

(52) U.S. Cl.
CPC ............. *B60H 1/004* (2013.01); *B60W 20/13* (2016.01); *B60W 2050/0043* (2013.01)

(58) Field of Classification Search
CPC ......... B60H 1/02; B60W 20/00; B60W 10/26; B60W 10/06; B60K 6/22
(Continued)

(56) References Cited

U.S. PATENT DOCUMENTS

2007/0265762 A1 11/2007 Suzuki
2010/0108032 A1* 5/2010 Pursifull ............... B60W 10/06
123/406.12
(Continued)

FOREIGN PATENT DOCUMENTS

EP 2 426 023 A1 3/2012
WO 2006/057433 A1 6/2006

OTHER PUBLICATIONS

International Search Report dated Aug. 13, 2015 in PCT/FR2015/051086 filed Apr. 22, 2015.
(Continued)

*Primary Examiner* — Tan Q Nguyen
(74) *Attorney, Agent, or Firm* — Oblon, McClelland, Maier & Neustadt, L.L.P.

(57) ABSTRACT

A system controls a drivability mode of a hybrid motor vehicle provided with a heat engine and with an electric engine. The system includes a first measurer for measuring running conditions of the vehicle, a second measurer for measuring a level of charge of a battery of the vehicle, a first controller for controlling the heat engine, a second controller for controlling the electric engine, a computer capable of emitting a first activation signal for the heat engine, and a second activation signal for the electric engine, as a function of the running conditions and of the level of charge, and a third measurer for measuring at least one characteristic relating to an operation of a heating system of the vehicle. The first activation signal and the second activation signal (Continued)

are generated on the basis of the characteristic relating to the operation of the heating system.

12 Claims, 2 Drawing Sheets

(51) Int. Cl.
*B60W 20/13* (2016.01)
*B60W 20/00* (2016.01)
*B60W 50/00* (2006.01)

(58) Field of Classification Search
USPC .......................................................... 701/22
See application file for complete search history.

(56) References Cited

U.S. PATENT DOCUMENTS

| | | | | |
|---|---|---|---|---|
| 2010/0280737 | A1* | 11/2010 | Ewert | B60K 6/445 |
| | | | | 701/102 |
| 2010/0282208 | A1 | 11/2010 | Pursifull et al. | |
| 2011/0288713 | A1 | 11/2011 | Pursifull et al. | |
| 2013/0020398 | A1* | 1/2013 | Goto | B60H 1/00285 |
| | | | | 237/12.4 |
| 2013/0103242 | A1* | 4/2013 | Takeuchi | B60K 6/36 |
| | | | | 701/22 |
| 2013/0184968 | A1* | 7/2013 | Kumano | B60L 11/1842 |
| | | | | 701/102 |
| 2013/0211650 | A1* | 8/2013 | Tashiro | B60W 10/06 |
| | | | | 701/22 |
| 2015/0246591 | A1* | 9/2015 | Ono | B60H 1/004 |
| | | | | 701/22 |

OTHER PUBLICATIONS

French Search Report dated Jan. 13, 2015 in FR 1453857 filed Apr. 29, 2014.

* cited by examiner

SYSTEM FOR CONTROLLING THE DRIVABILITY MODE OF A HYBRID MOTOR VEHICLE

BACKGROUND

The invention relates to the control of the drivability mode of hybrid motor vehicles, in particular those provided with a heat engine and an electric engine.

The conventional motor vehicles are generally provided with a heating system with an air heater transferring heat given off by the heat engine to a volume of heating water. The duly heated water conveys its energy by transferring it to the air of the vehicle interior.

These days, hybrid vehicles are known, for example comprising a heat engine and an electric engine powered by a battery. These vehicles are also provided with a system for controlling the drivability mode, the function of which is to control the starting up of one and/or of the other of the two engines. Some controls of the drivability modes are also capable of running the electric engine in generator mode.

Conventionally, the system for controlling the drivability mode assigns different drivability modes according to different driving situations, such as starting, moving at cruising speed, accelerating, decelerating, stopping the vehicle. For example, when accelerating, the control system generally activates both of the engines of the vehicle, the electric engine relieving the heat engine. When decelerating, the electric engine logically operates as engine brake, that is to say as a generator so as to recharge the battery of the vehicle while exerting a braking action thereon.

In some vehicles, the assignment of a drivability mode depends also on the level of charge of the battery. In effect, if the vehicle accelerates with a fully charged battery, the control system can decide to start up only the electric engine. The result thereof is less significant consumption and pollution.

Thus, in a hybrid vehicle provided with a heating device, it may be that the intermittent operation of the heat engine disrupts the operation of the heating by reducing the temperature of the heating water. This disruption results in reduced comfort for the driver and increased fuel consumption.

BRIEF SUMMARY

The aim of the invention is therefore to propose a system for controlling the drivability mode of a hybrid motor vehicle which does not disrupt the operation of the heating system of the vehicle.

According to a first aspect, a subject of the invention is a system for controlling the drivability mode of a hybrid motor vehicle provided with a heat engine and with an electric engine, comprising:
first measurement means for measuring running conditions of the vehicle,
second measurement means for measuring the level of charge of the battery of the vehicle,
first control means for controlling the heat engine,
second control means for controlling the electric engine, and
computation means capable of emitting a first activation signal for the heat engine, and a second activation signal for the electric engine, as a function of the running conditions and of the level of charge of the battery.

Furthermore, the control system comprises third measurement means for measuring at least one characteristic relating to the operation of the heating system of the vehicle, the first activation signal and the second activation signal being generated on the basis of the characteristic relating to the operation of the heating system.

In this way, it is possible to take into account a characteristic relating to the operation of the heating system to determine an optimal drivability mode for the vehicle. The result thereof is increased efficiency of the heating system, and thus energy savings and increased comfort for the driver.

According to one embodiment, the first measurement means for measuring the running conditions comprise sensors for measuring running parameters such as the type of driving, the type of journey, the acceleration or the braking of the vehicle and the stopping of the vehicle.

Provision can also be made for the computation means to comprise a first comparator capable of computing a first signal of deviation of the level of charge of the battery of the vehicle from the level of charge of the battery and from a predefined reference level of charge.

In one embodiment, the computation means are provided with a first proportional integral derivative corrector capable of emitting a first correction signal for the level of charge of the battery as a function of the first deviation signal computed by the first comparator.

In another embodiment, the characteristic relating to the operation of the heating system is the water temperature of the heating system of the vehicle.

The temperature of the heating water is a parameter representative of the efficiency of the heating system, which allows for a more sensitive control thereof.

Provision can also be made for the computation means to comprise a second comparator capable of computing a second signal of deviation of the water temperature of the heating system of the vehicle from the characteristic relating to the operation of the heating system and from a predefined reference water temperature.

It is also possible to provide the computation means with a second proportional integral derivative corrector capable of emitting a second correction signal for the level of charge of the battery as a function of the second deviation signal computed by the second comparator.

In a preferred embodiment, the second activation signal for the electric engine comprises information making it possible to run the electric engine of the vehicle in generator mode.

In another embodiment, at least one of the activation signals contains information making it possible to control the torque and/or the speed of rotation of the corresponding engine(s).

According to another aspect, the invention relates to a method for controlling the drivability mode of an electric hybrid motor vehicle, comprising a first phase of measurement of running conditions and of the level of charge of the battery, a second phase of computation of a first activation signal for the heat engine and of a second activation signal for the electric engine as a function of the running conditions and of the level of charge of the battery. In the first measurement phase, at least one characteristic relating to the operation of the heating system of the vehicle is measured, the first activation signal and the second activation signal being generated on the basis of the characteristic relating to the operation of the heating system.

BRIEF DESCRIPTION OF THE DRAWINGS

Other aims, features and advantages of the invention will become apparent on reading the following description of a few embodiments constituting only nonlimiting examples, and given with reference to the attached drawings in which.

DETAILED DESCRIPTION

Figure 1:
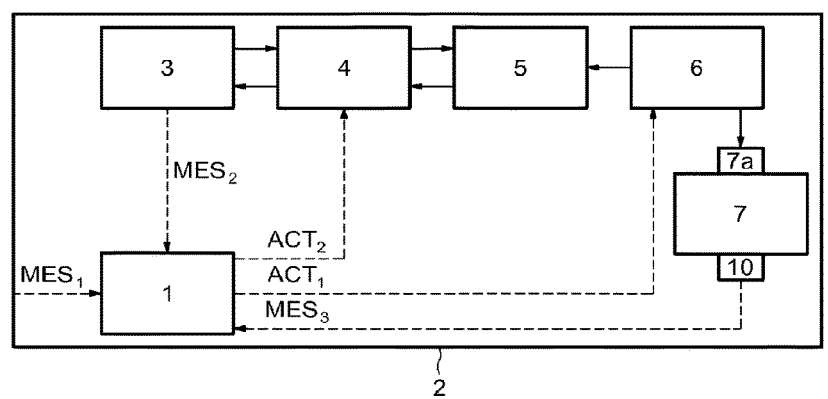
FIG. 1 is a block diagram of a hybrid motor vehicle comprising a system for controlling the drivability modes according to an embodiment of the invention.

The vehicle 2 schematically illustrated in FIG. 1 is a hybrid motor vehicle. It is provided with a system for controlling the drivability mode 1 and comprises a heat engine 6 and an electric engine 4, linked to a clutch 5. The vehicle 2 comprises a battery 3 for powering the electric engine 4. The electric engine 4 is further capable of operating in generator mode, that is to say that the motor shaft is driven by the clutch, the engine recharging the battery. It further comprises a heating system 7 provided with an air heater 7a.

The energy transfers between these various components have been represented by arrows in FIG. 1. The battery 3 sends electrical energy to the electric engine 4. The battery 3 is recharged from the mechanical energy of the clutch 5, via the electric engine 4. The mechanical energy of the clutch 5 can originate from the wheels, if the vehicle is in motion, or from the heat engine, if the vehicle is stopped. The heat engine 6 also communicates energy to the heating system 7 by means of the air heater 7a. Finally, the electric engine 4 and the heat engine 6 communicate mechanical energy to the clutch 5.

The control system 1 collects information emitted by some of the abovementioned components. In particular, the system 1 collects a set of signals conveying information concerning the running conditions of the vehicle. The concept of measuring the running conditions should be understood to mean determining the operating situation of the vehicle at a defined instant. The vehicle in this respect comprises a multitude of means for measuring the running conditions such as the speed counter of the vehicle, a means for measuring the pressure on the accelerator and brake pedals, a detector capable of determining the gear engaged, etc. For example, the control system 1 receives the signals $S_{ACC}$, $S_{FR}$, $S_V$ which respectively contain information on the acceleration of the vehicle, on braking, on the gear engaged. These signals are collected in order to find out, for example, whether the vehicle 2 is in starting, acceleration, cruising, deceleration, stopping or other such phase. All these signals are synthesized and a signal $MES_1$ summarizing the information measured by the means for measuring the running conditions is emitted. In this way, the control system 1 can detect the running conditions of the motor vehicle, which provides it with a first criterion for determining which engine(s) should be started up.

The control system 1 also receives a signal $MES_2$ containing information originating from the battery 3, concerning its level of charge. The battery discharges when the electric engine 4 is operated and recharges when the heat engine 6 is operated. The level of charge of the battery 3 is therefore forced to vary greatly, and the value of the signal $MES_2$ is a second decision criterion for the control system 1.

The control system 1 also collects signals emitted by sensors of the heating system 7 of the vehicle. In particular, third measurement means are provided to determine a characteristic relating to the operation of the heating system of the vehicle. These third means comprise, for example, a sensor 10 arranged so as to measure the temperature of the water $MES_3$ of the heating system 7 of the vehicle which is transmitted to the control system 1. This information constitutes a third decision criterion for the latter.

The control system 1 is moreover capable of emitting a first activation signal $ACT_1$ and a second activation signal $ACT_2$. The first activation signal $ACT_1$ makes it possible to start or stop the heat engine 6. The second activation signal $ACT_2$ makes it possible to start or stop the electric engine 4.

Figure 2:
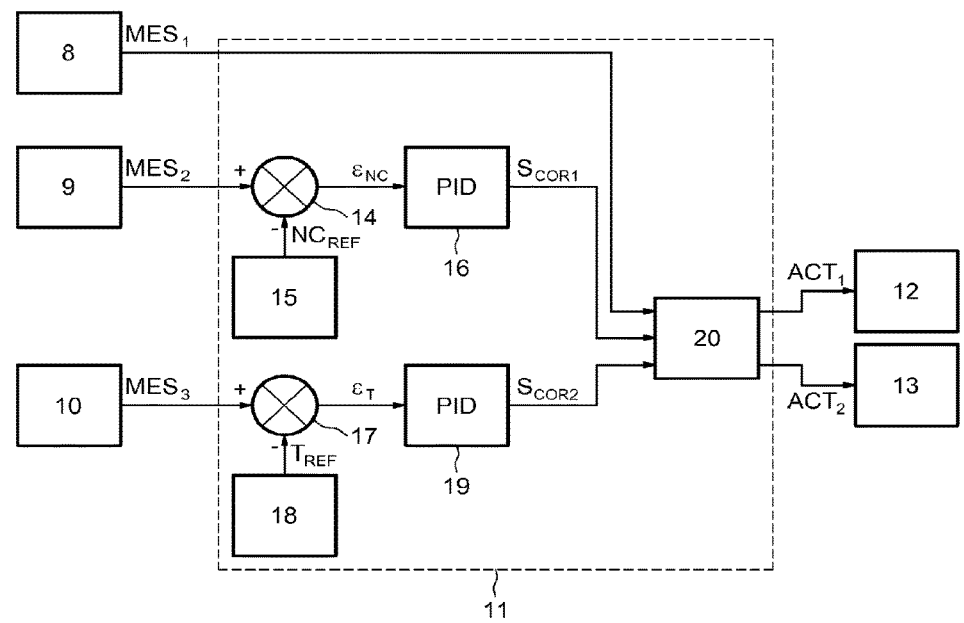
FIG. 2 is a diagram of the control system of the embodiment of FIG. 1.

FIG. 2 shows the control system 1 in more detail. It can in particular be seen that the system 1 comprises computation means 11, capable of cooperating with the elements represented in FIG. 1.

In particular, the computation means 11 cooperate with the first measurement means 8 for measuring running conditions of the vehicle. The first measurement means 8, the function of which is to determine the running conditions of the vehicle, are further capable of analyzing the signals received to emit a first measurement signal $MES_1$.

The computation means 11 receive the signal $MES_2$ originating from the second measurement means 9. In this case, it is a sensor of the level of charge of the battery of the vehicle.

The computation means 11 finally collect the signal $MES_3$ of measurement of the heating water temperature emitted by the third measurement means 10.

The first activation signal $ACT_1$ of the heat engine 6 of the vehicle, and the second activation signal $ACT_2$ of the electric engine 4 of the vehicle are supplied respectively to a first control module 12 of the heat engine, and to a second control module 13 of the electric engine. The control module 12 comprises hardware and software means making it capable of controlling the starting or the stopping of the heat engine 6. The second control module 13, for its part, is capable of starting or stopping the electric engine 4. Furthermore, the second control module 13 is capable of operating the electric engine in generator mode.

The computation means 11 comprise a comparator 14 and a first parameterizing module 15. This module 15 is used to parameterize a reference level of charge $NC_{REF}$ of the battery 3 of the vehicle. For example, if the battery is completely drained, only the heat engine can be started. Moreover, if the battery is fully charged, it cannot be charged more, and the energy harvested following braking is dispersed. Each of these extreme situations leads to more significant fuel consumption and pollutant emissions. There is therefore a reference level of charge $NC_{REF}$ for optimal use around which the real level of charge of the battery of the vehicle must be kept to minimize the risk of being in one of these situations. This reference level of charge is parameterized in advance by means of the first parameterizing module 15. By means of the comparator 14, the computation means 11 compute the deviation $\varepsilon_{NC}$ between the level of charge of the battery and the reference level of charge.

The computation means 11 comprise a first proportional integral derivative (PID) corrector 16. The latter processes the deviation signal $\varepsilon_{NC}$ so as to emit a first correction signal $S_{COR1}$ for the level of charge of the battery of the vehicle. It will for example be possible to incorporate the corrector 16 into a closed loop correction system.

The computation means 11 comprise a second comparator 17, a second parameterizing module 18 and a second proportional integral derivative corrector 19. The second parameterizing module 18 makes it possible to integrate a reference water temperature value $T_{REF}$. This is the temperature of the heating water for which there is optimal operation of the heating system 7 of the vehicle. The water temperature deviation signal $\varepsilon_T$ is computed by means of the comparator 17. This signal is transmitted to the corrector 19 which emits a second correction signal $S_{COR2}$ for the water temperature of the vehicle.

The computation means 11 further comprise a computer 20 which receives the correction signals $S_{COR1}$ and $S_{COR2}$, as well as the first measurement signal $MES_1$. The computer processes these three signals in order to make a decision concerning the most appropriate drivability mode.

For example, in a phase of high acceleration with a half-charged battery, the computer 20 generally decides to run the heat engine and the electric engine jointly. The computer 20 then delivers the activation signals $ACT_1$ and $ACT_2$ respectively to the first control module and to the second control module 13. The result thereof is that both engines are started. In another example, if the battery is not full and the vehicle slows down, then it is possible to stop the heat engine 6 and run the electric engine 4 in generator mode.

Another embodiment can be envisaged in which at least one of the activation signals $ACT_1$ and $ACT_2$ contains, in addition to the information on starting or stopping of the engine which corresponds to it, the information required to control the engine in terms of torque and/or speed of rotation. A more precise controlling of the drivability mode is then made possible. In such an embodiment, the control modules 12 and 13 comprise hardware and software means making it possible to control the torque and speed of rotation of the engines of the vehicle, according to the instructions provided by the activation signals $ACT_1$ and $ACT_2$.

Figure 3:
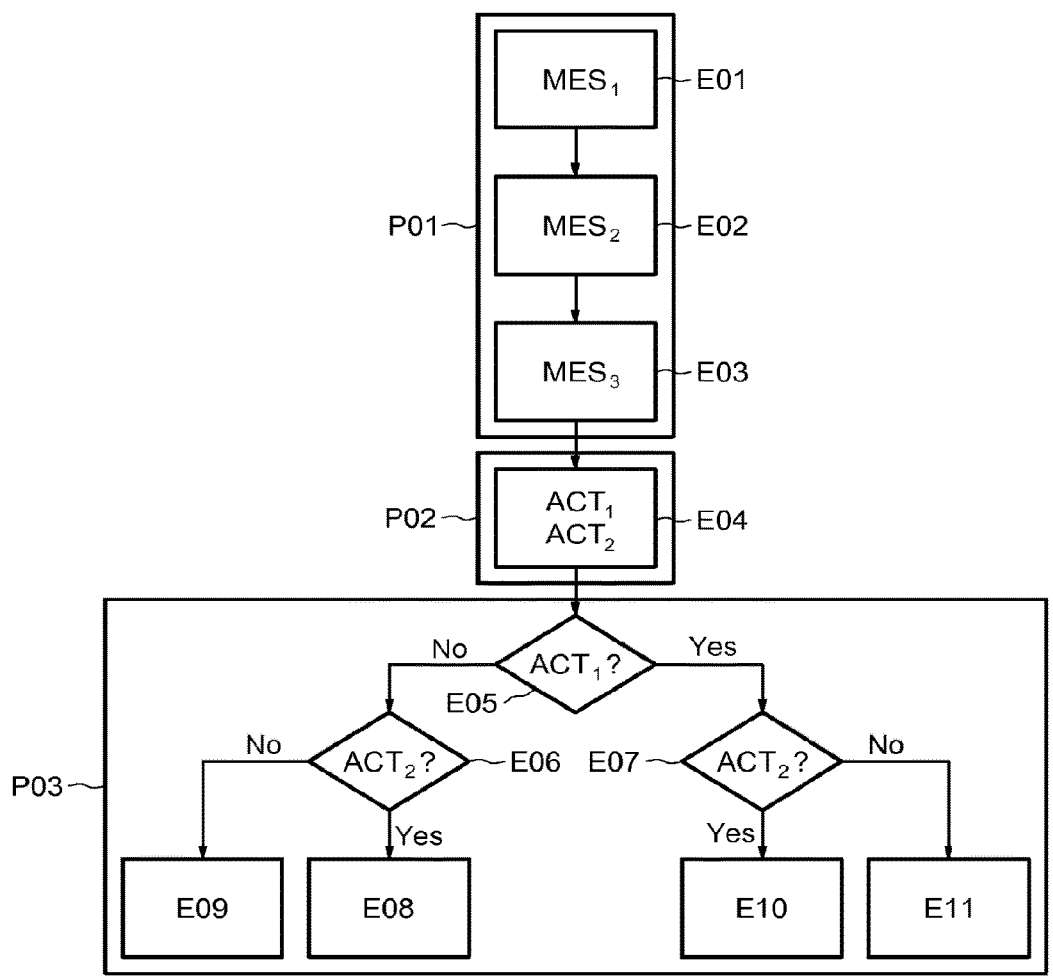
FIG. 3 represents a method for controlling the drivability mode according to an embodiment of the invention.

FIG. 3 shows a method for controlling the drivability mode of a hybrid vehicle according to one implementation of the invention. In this example, the hybrid vehicle comprises a heat engine and an electric engine.

The control method can be implemented on the basis of a controlling system as described in FIGS. 1 to 3. The control method can be implemented at any instant provided that the vehicle is currently in use.

The method comprises a first step E01 of measurement of parameters relating to the running conditions of the vehicle. As previously, running conditions should be understood to mean possible situations of the vehicle, for example situations of starting, moving at cruising speed, accelerating, decelerating, stopping of the vehicle. In this respect, it will in particular be possible to perform measurements of acceleration, of speed, of pressure on the accelerator and brake pedals, even of the gear engaged.

The method comprises a second step E02 of measurement of the level of charge of the battery of the vehicle.

The method comprises a third step E03 of measurement of parameters relating to the operation of the heating system of the vehicle. In this case, a parameter is measured which is the temperature of the heating water of the heating system.

The steps E01, E02 and E03 constitute a first measurement phase P01. It will in particular be noted that the phase P01 comprises a step of measurement of a characteristic relating to the operation of the heating system of the vehicle.

The method then comprises a second computation phase P02 comprising a fourth step E04 of generation of two activation signals from the signals measured in the first measurement phase P01. During this step, information such as the running conditions of the vehicle, the level of charge of the battery and the temperature of the heating water is analyzed so as to determine the most appropriate drivability mode of the vehicle. In other words, a determination is made as to whether the vehicle should start one and/or the other of its engines. There are then emitted a first activation signal for the heat engine $ACT_1$ and a second activation signal for the electric engine $ACT_2$. The first signal $ACT_1$ conveys the commands to start and stop the heat engine of the vehicle, whereas the second signal $ACT_2$ conveys the same commands concerning the electric engine of the vehicle. Furthermore, the second signal $ACT_2$ is capable of running the electric engine of the vehicle in generator mode. It is also possible to envisage, without departing from the scope of the invention, a method in which the signals generated in this fourth step respectively contain information making it possible to control the torque and speed of rotation of each of the two engines of the vehicle.

The method then comprises a first test step E05. During this step, the signal $ACT_1$ for activation of the heat engine of the vehicle is analyzed. It will be recalled that the signal $ACT_1$, like the signal $ACT_2$, can have two values, one denoted YES resulting in the starting of the heat engine, the other denoted NO resulting in the stopping thereof.

If the value of the signal $ACT_1$ is NO, a second test step E06 is implemented, relating to the value of the signal $ACT_2$. If this value is YES, a step E08 is applied during which the electric engine of the vehicle is started and the heat engine is stopped. If the value is NO, a step E09 is applied during which both engines of the vehicle are stopped.

If the value of the signal $ACT_1$ is YES, a third test step E07 is implemented, relating to the analysis of the value of the signal $ACT_2$. If this value is YES, a step E10 is applied during which both engines of the vehicle are started. If the value is NO, a step E11 is applied during which the electric engine of the vehicle is stopped and the heat engine is started.

The steps E05, E06, E07, E08, E09, E10 and E11 constitute a third control phase P03.

Thus, by means of such a method, it is possible to determine and implement an optimal drivability mode as a function of parameters and in particular of a characteristic relating to the operation of the heating system of the vehicle. The result thereof is better operation of this heating system, and therefore increased comfort for the driver, and energy savings.

By means of a control system like that described with reference to FIGS. 1 to 3, means are available for determining the optimal drivability mode by taking account of a characteristic relating to the operation of the heating system of the vehicle.

By using a heating water temperature sensor, the selected drivability mode is matched to a parameter that is particularly relevant in relation to the efficiency of the heating system.

By using activation signals that make it possible to control one or other of the engines in terms of torque and rotation speed, an even finer control of the drivability modes is allowed, allowing for a reinforced efficiency of the heating system.

The invention claimed is:

1. A system for controlling a drivability mode of a hybrid motor vehicle provided with a heat engine and with an electric engine, comprising:
    first measurement means for measuring running conditions of the vehicle;
    second measurement means for measuring a level of charge of a battery of the vehicle;
    third measurement means for measuring at least one characteristic relating to an operation of a heating system of the vehicle;
    first control means for controlling the heat engine;

second control means for controlling the electric engine;

computation means capable of emitting a first activation signal to turn the heat engine on or off, and a second activation signal to turn the electric engine on or off, and the computation means generates the first activation signal and the second activation signal as a function of the running conditions, of the level of charge, and of the characteristic relating to the operation of the heating system.

2. The control system as claimed in claim 1, wherein the first measurement means for measuring the running conditions comprise sensors for measuring running parameters such as a type of driving, a type of journey, acceleration or braking of the vehicle, and stopping of the vehicle.

3. The control system as claimed in claim 1, wherein the computation means comprise a first comparator capable of computing a first signal of deviation of the level of charge of the battery of the vehicle from the level of charge and from a predefined reference level of charge.

4. The control system as claimed in claim 3, wherein the computation means comprise a first proportional integral derivative corrector capable of emitting a first correction signal for the level of charge of the battery as a function of the first deviation signal computed by the first comparator.

5. The control system as claimed in claim 1, wherein the characteristic relating to the operation of the heating system is the water temperature of the heating system of the vehicle.

6. The control system as claimed in claim 5, wherein the computation means comprise a second comparator capable of computing a second signal of deviation of the water temperature of the heating system of the vehicle from the water temperature of the heating system and from a predefined reference water temperature.

7. The control system as claimed in claim 6, wherein the computation means comprise a second proportional integral derivative corrector capable of emitting a second correction signal for the level of charge of the battery as a function of the second deviation signal computed by the second comparator.

8. The control system as claimed in claim 1, wherein the second activation signal for the electric engine contains information making it possible to run the electric engine of the vehicle in generator mode.

9. The control system as claimed in claim 1, wherein at least one of the activation signals contains information making it possible to control a torque and/or a speed of rotation of the corresponding engine(s).

10. The control system as claimed in claim 1, wherein the computation means generates the first activation signal to turn the heat engine on or off and then generates the second activation signal to turn the electric engine on or off.

11. The control system as claimed in claim 1, wherein the first activation signal is generated to turn the heat engine on or off and then the second activation signal is generated to turn the electric engine on or off.

12. A method for controlling a drivability mode of an electric hybrid motor vehicle, comprising:
   measuring running conditions of the vehicle;
   measuring a level of charge of a battery of the vehicle;
   measuring at least one characteristic relating to an operation of a heating system of the vehicle;
   computing a first activation signal to turn a heat engine on or off and a second activation signal to turn an electric engine of the motor vehicle on or off as a function of the running conditions, of the level of charge, and of the characteristic relating to the operation of the heating system; and
   turning the heat engine on or off based on the first activation signal and turning the electric engine on or off based on the second activation signal.

* * * * *